(12) United States Patent
Yokota et al.

(10) Patent No.: US 9,839,934 B2
(45) Date of Patent: Dec. 12, 2017

(54) OPTICAL FIBER RE-COATING DEVICE

(71) Applicant: FUJIKURA LTD., Koto-ku, Tokyo (JP)

(72) Inventors: Koichi Yokota, Sakura (JP); Noriyuki Kawanishi, Sakura (JP); Yoshiharu Kanda, Sakura (JP); Ryo Hasegawa, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/904,479

(22) PCT Filed: Jan. 23, 2015

(86) PCT No.: PCT/JP2015/051857
§ 371 (c)(1),
(2) Date: Jan. 12, 2016

(87) PCT Pub. No.: WO2016/051812
PCT Pub. Date: Apr. 7, 2016

(65) Prior Publication Data
US 2016/0228907 A1    Aug. 11, 2016

(30) Foreign Application Priority Data

Sep. 30, 2014  (JP) ................................ 2014-202250
Oct. 3, 2014   (WO) .................. PCT/JP2014/076553
Jan. 16, 2015  (JP) ................................ 2015-007036

(51) Int. Cl.
*B05B 5/00*     (2006.01)
*B05C 13/02*    (2006.01)
(Continued)

(52) U.S. Cl.
CPC .............. *B05C 13/02* (2013.01); *B29C 39/10* (2013.01); *C03C 17/02* (2013.01); *C03C 25/12* (2013.01); *G02B 6/02395* (2013.01); *G02B 6/44* (2013.01)

(58) Field of Classification Search
USPC ......... 118/325, 603, 641–643; 425/117, 173, 425/174.4, 169; 264/1.25, 1.27
See application file for complete search history.

(56) References Cited

U.S. PATENT DOCUMENTS 4,102,717 A * 7/1978 Hensel ................ G02B 6/3803
                                                      156/158
6,688,870 B2 * 2/2004 Shibata .................... B05C 3/12
                                                      264/1.25
(Continued)

FOREIGN PATENT DOCUMENTS

CN         1330049 A    1/2002
CN         1396134 A    2/2003
(Continued)

OTHER PUBLICATIONS

JPO Office Action for Application No. 2014-202250 dated Nov. 18, 2014.
(Continued)

*Primary Examiner* — Yewebdar Tadesse
(74) *Attorney, Agent, or Firm* — Sughrue Mion, PLLC

(57) ABSTRACT

An optical fiber re-coating device of the invention includes an optical fiber coater that includes: an inner glass opening-and-closing unit including: a pair of glass members having grooves formed thereon; and a pair of mounting tables which are coupled to each other via a first hinge; and an outer opening-and-closing unit including: a pair of covers which are coupled to each other via a second hinge, one of the paired covers having a magnet provided therein, the other of the paired covers having a magnet catch provided therein, the magnet and the magnet catch facing each other when the paired covers are in a closed state; and light sources that cure a resin used to coat an optical fiber (Continued)

provided in the inner glass opening-and-closing unit and are provided in the respective paired covers.

12 Claims, 7 Drawing Sheets

(51) Int. Cl.
*B29C 39/10* (2006.01)
*C03C 25/12* (2006.01)
*G02B 6/44* (2006.01)
*C03C 17/02* (2006.01)
*G02B 6/02* (2006.01)

(56) References Cited

U.S. PATENT DOCUMENTS

| | | | |
|---|---|---|---|
| 7,204,683 B2* | 4/2007 | Shibata | C03C 25/12 425/116 |
| 2002/0033546 A1 | 3/2002 | Kojima et al. | |
| 2002/0066407 A1 | 6/2002 | Shibata et al. | |
| 2002/0184924 A1 | 12/2002 | Choi et al. | |
| 2003/0026919 A1 | 2/2003 | Kojima et al. | |
| 2003/0062637 A1 | 4/2003 | Alden et al. | |
| 2003/0215195 A1 | 11/2003 | Koike et al. | |
| 2004/0037528 A1 | 2/2004 | Kanai et al. | |

FOREIGN PATENT DOCUMENTS

| | | | |
|---|---|---|---|
| CN | 1978171 A | | 6/2007 |
| JP | 09060390 A | * | 3/1997 |
| JP | 2002-72000 A | | 3/2002 |
| JP | 2003-89555 A | | 3/2003 |
| JP | 2003-167150 A | | 6/2003 |
| JP | 2003167150 A | * | 6/2003 |
| JP | 2003-337247 A | | 11/2003 |
| JP | 2003337265 A | | 11/2003 |
| JP | 2004-509361 A | | 3/2004 |

OTHER PUBLICATIONS

JPO Notice of Allowance for Application No. 2014-202250 dated Feb. 24, 2015.
JPO Office Action for Application No. 2015-007036 dated Mar. 10, 2015.
JPO Notice of Allowance for Application No. 2015-007036 dated Aug. 4, 2015.
Communication dated Jun. 28, 2017, from the European Patent Office in counterpart European Application No. 15817043.1.
Communication dated Feb. 8, 2017, from the State Intellectual Property Office of People's Republic of China in counterpart Application No. 201580001348.5.

* cited by examiner

OPTICAL FIBER RE-COATING DEVICE

TECHNICAL FIELD

The present invention relates to an optical fiber re-coating device.

This application is a National Stage of International Application No. PCT/JP2015/051857, filed on Jan. 23, 2015, which claims priority from Japanese Patent Application No. 2014-202250 filed on Sep. 30, 2014, International Patent Application No. PCT/JP2014/076553 filed on Oct. 3, 2014, and Japanese Patent Application No. 2015-007036 filed on Jan. 16, 2015, the contents of which are incorporated herein by reference.

BACKGROUND ART

The following Patent Document 1 discloses an optical fiber coating device that can reduce an increase size of a power unit due to deterioration in the emission efficiency of UV light emitted from a UV lamp. The aforementioned optical fiber coating device uses one or more ultraviolet light LDs or ultraviolet light LEDs as a light source that emits UV light, uses the ultraviolet light LD or the ultraviolet light LEDs to cure a UV curable resin that is adhered to a periphery of a bare optical fiber drawn from a preform, uses the ultraviolet light LDs or the ultraviolet light LEDs to cure a UV curable resin when re-coating a coating formation portion that is processed by removing a coating of a coated optical fiber, selects the ultraviolet light LDs or the ultraviolet light LEDs which are one-dimensionally, two-dimensionally, or three-dimensionally aligned, controls them to be available. The optical fiber coating device includes: a molding die that is openably and closably attached thereto and is used to coat an optical fiber with a resin; and a control circuit provided with functional operation programs in accordance with the kinds of molding die, the control circuit scans the sign that is added to the molding die, recognizes it, selects a suitable program, and operates it. Additionally, the optical fiber coating device includes a shield lid that is openably and closably attached thereto and can shield external light from the molding die.

PRIOR ART DOCUMENTS

Patent Documents

[Patent Document 1]Japanese Unexamined Application, First Publication No. 2003-89555

SUMMARY OF INVENTION

Problems to be Solved by the Invention

However, in the aforementioned conventional art, the shield lid is not coupled to the molding die, and an operator can close the shield lid and the molding die together in a closing operation by pressing the top surface of the shield lid; however, since the shield lid is not coupled to the molding die in an opening operation, it is necessary to independently open the shield lid and the molding die, and there is a problem in that it is difficult to handle them.

The invention was conceived in view of the above-described circumstances and has an object thereof to improve handleability more than ever before.

Means For Solving the Problems

In order to achieve the aforementioned object, the invention adopts a first solution means which is an optical fiber re-coating device including an optical fiber coater that cures resin and coats a coating-removed portion of an optical fiber therewith. The optical fiber coater includes: an inner glass opening-and-closing unit including: a pair of glass members having grooves formed thereon; and a pair of mounting tables on which the respective glass members are provided and which are coupled to each other via a first hinge, wherein a hollow that is used to coat an optical fiber is formed by matching the grooves of the paired glass members when the mounting tables are in a closed state; and an outer opening-and-closing unit including: a pair of covers into which the respective paired mounting tables are fitted and which are coupled to each other via a second hinge, one of the paired covers having a magnet provided therein, the other of the paired covers having a magnet catch provided therein, the magnet and the magnet catch facing each other when the paired covers are in a closed state; and light sources that cure a resin used to coat an optical fiber provided in the inner glass opening-and-closing unit and are provided in the respective paired covers, and wherein the inner glass opening-and-closing unit and the outer opening-and-closing unit are removable; when the paired covers are in a closed state, the magnet attracts the magnet catch, the paired glass members are butt-jointed to each other, and the hollow is thereby in a closed state.

The invention adopts a second solution means which is an optical fiber re-coating device including: an optical fiber coater that cures resin and coats a coating-removed portion of an optical fiber therewith. The optical fiber coater includes: an inner glass opening-and-closing unit including: a pair of glass members having grooves formed thereon; and a pair of mounting tables on which the respective glass members are provided and which are coupled to each other via a first hinge, wherein a hollow that is used to coat are optical fiber is formed by matching the grooves of the paired glass members when the mounting tables are in closed state; and an outer opening-and-closing including: a pair of covers into which the respective paired mounting tables are fitted and which are coupled to each other via a second hinge, one of the paired covers having a magnet provided therein, the other of the paired covers having a magnet catch provided therein, the magnet and the magnet catch facing each other when the paired covers are in a closed state; and a light source that cures a resin used to coat an optical fiber provided in the inner glass opening-and-closing unit and is provided in one of the paired covers, and wherein the inner glass opening-and-closing unit and the outer opening-and-closing unit are removable; when the paired covers are in a closed state, the magnet attracts the magnet catch, the paired glass members are butt-jointed to each other, and the hollow is thereby in a closed state.

In the above-mentioned first and second solution means, the invention adopts a third solution means in which the first hinge includes a play-reducing mechanism that is used to reduce play.

In the above-mentioned third solution means, the invention adopts a fourth solution means in which the play-reducing mechanism is a pressing mechanism that presses, toward a center of the ball bearing, against a peripheral surface of an outer ring of a ball bearing provided in the first hinge.

In the above-mentioned fourth means, the invention adopts a fifth solution means in which the first hinge includes a first ball bearing used for open and close and a second ball bearing that is used to reduce play, and the pressing mechanism presses the second ball bearing.

In any one of the first solution means to the fifth solution means, the invention adopts a sixth solution means which the second hinge includes a friction applying mechanism that comes into contact with a peripheral surface of a rotation shaft of the second hinge, thereby generates a frictional three thereon, and is used to reduce an impact during operation of opening and closing the inner glass opening-and-closing unit and the outer opening-and-closing unit.

In the above-mentioned sixth solution means, the invention adopts a seventh solution means in which the second hinge includes a friction applying control mechanism that limits the range in which the rotation shaft is in contact with the friction applying mechanism during rotation of the rotation shaft.

Effects of the Invention

According to the invention, the optical fiber re-coating device include the optical fiber coater cures resin and coats a coating-removed portion of an optical fiber therewith, the optical fiber coater including: an inner glass opening-and-closing unit including: a pair of glass members having grooves formed thereon; and a pair of mounting tables on which the respective glass members are provided and which are coupled to each other via a first hinge, wherein a hollow that is used to coat an optical fiber is formed by matching the grooves of the paired glass members when the mounting tables are in a closed state; and an outer opening-and-closing unit including: a pair of covers into which the respective paired mounting tables are fitted and which are coupled to each other via a second hinge, one of the paired covers having a magnet provided therein, the other of the paired covers having a magnet catch provided therein, the magnet and the magnet catch facing each other when the paired covers are in a closed state; and a light source that cures a resin used to coat an optical fiber provided in the inner glass opening-and-closing unit and is provided in both the paired covers or in one of the paired covers, and wherein the inner glass opening-and-closing unit and the outer opening-and-closing unit are removable; when the paired covers are in a closed state, the magnet attracts the magnet catch, the paired glass members are butt-jointed to each other, and the hollow is thereby in a closed state. According to the invention, when the outer opening-and-closing unit (corresponding to the aforementioned shield lid) is in an open state, since the inner glass opening-and-closing unit (corresponding to the aforementioned molding die) can be also in an open state, it is possible to improve handleability more than ever before.

EMBODIMENTS FOR CARRYING OUT THE INVENTION (First Embodiment)

A first embodiment will be described. An optical fiber re-coating device A according to the first embodiment is an apparatus that removes a coating (intermediate coating) of an optional intermediate portion of an optical fiber and re-coats a portion at which an optical-fiber type optical component was manufactured. Particularly, an optical fiber which is subjected to re-coating by use of the above-mentioned optical fiber re-coating device A has a cladding and a coating that coats the outer-periphery of the cladding which are concentrically formed in order from the center of an axis. Furthermore, the coating of the optical fiber is made of ultraviolet curable resins such as urethane acrylate resins, epoxy acrylate resins, polybutadiene acrylate resins, silicone acrylate resins, and polyester acrylate resins.

Figure 1:
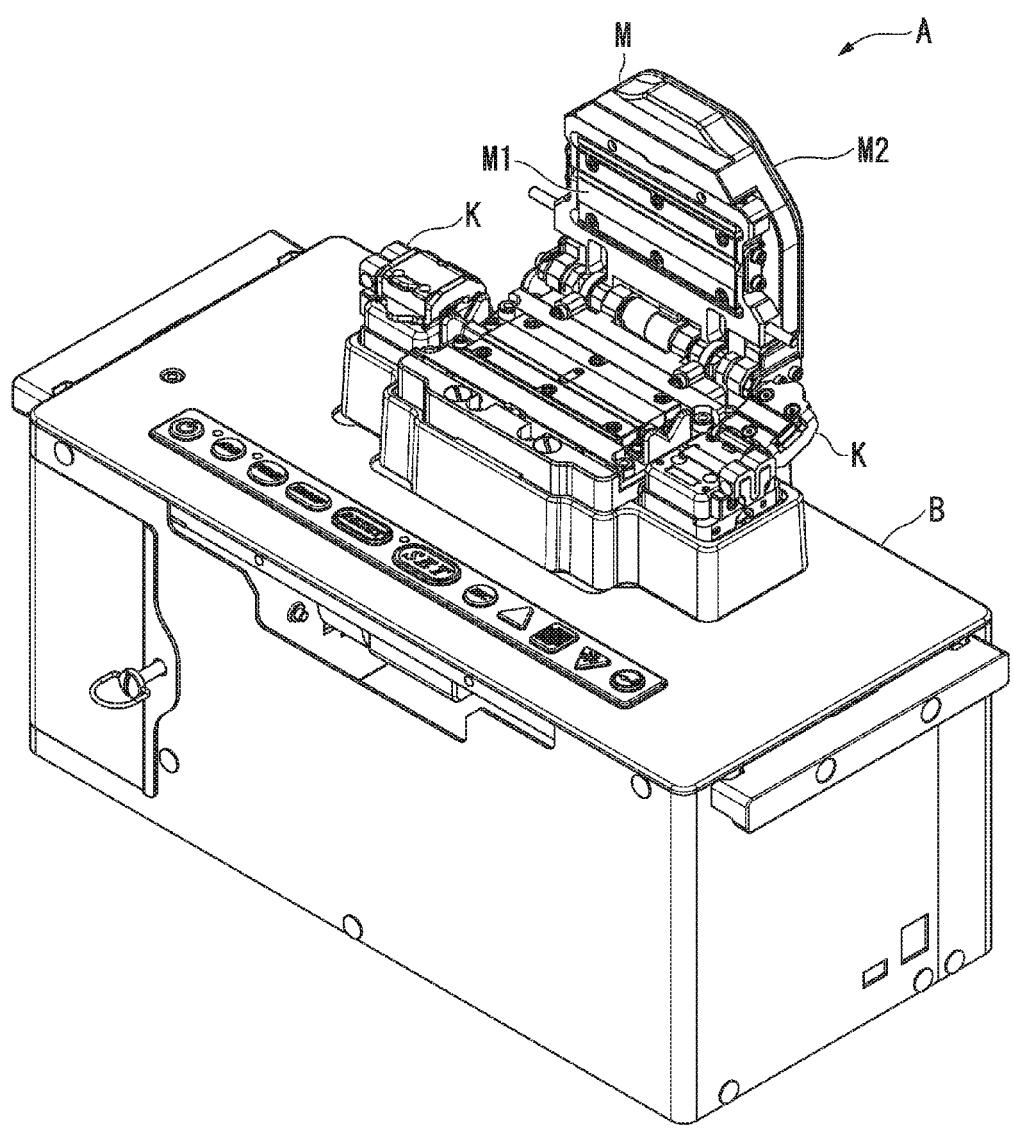
FIG. 1 is a perspective view showing an optical fiber re-coating device according to a first embodiment of the invention.

As shown in FIG. 1, the above-mentioned optical fiber re-coating device A includes: an optical fiber coater M, an optical fiber holder K, and a base B.

As shown in FIG. 1, the optical fiber coater M is constituted of: an inner glass opening-and-closing unit M1 which is configured to include a pair of upper and lower forming members made of a transparent material such as a silica glass; and an outer opening-and-closing unit M2 which covers the inner glass opening-and-closing unit M1 from the top and the bottom thereof.

Figure 2A:
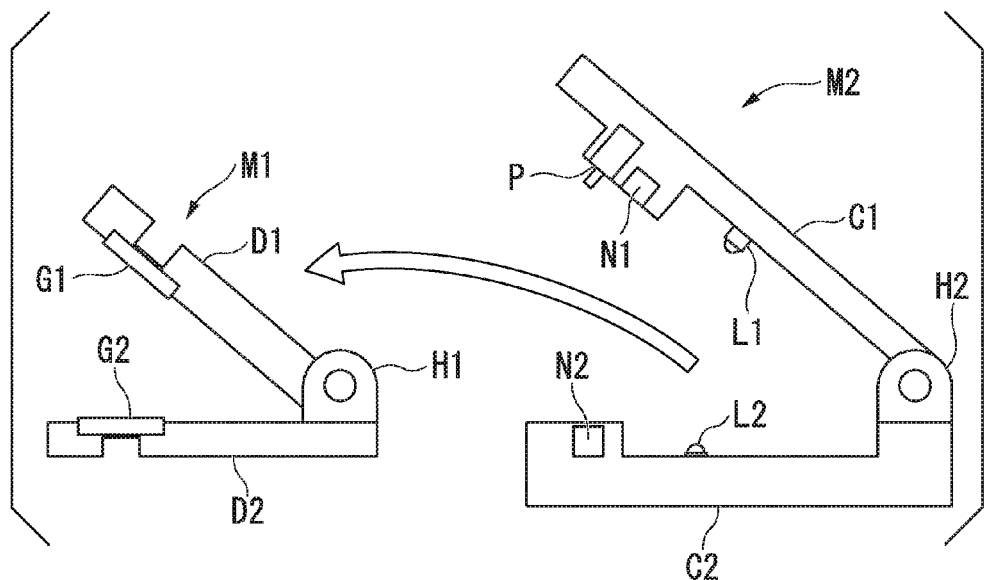
FIG. 2A is a schematic view showing an inner glass opening-and-closing unit and an outer opening-and-closing unit according to the first embodiment of the invention.
Figure 2B:
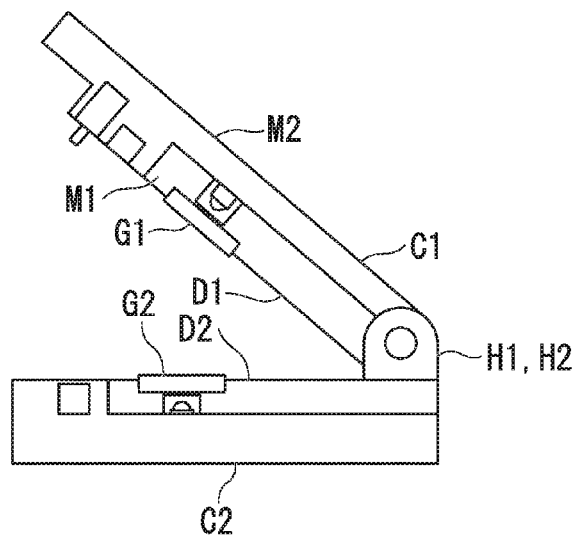
FIG. 2B is a schematic view showing an inner glass opening-and-closing unit and an outer opening-and-closing unit according the first embodiment of the invention.

As shown in FIGS. 2A and 2B, the inner glass opening-and-closing unit M1 is provided with a pair of glass members G1 and G2, a pair of mounting tables D1 and D2, and a first hinge H1.

The glass members G1 and G2 which are forming members of the above-mentioned inner glass opening-and-closing unit M1 include grooves which are used for re-coating and provided at the respective center portions of the surfaces which are butt-jointed to each other. When the above-described glass members G1 and G2 are butt-jointed to each other, the above-mentioned grooves form a cavity having a substantially cylindrically-shaped air space.

At this time, the glass members G1 and G2 of the above-mentioned inner glass opening-and-closing unit M1 are in a state of sandwiching the cavity therebetween at the top and bottom. In the optical fiber coater M, the upper glass member G1 is fixed on the upper mounting table D1. On the other hand, the lower glass member G2 is fixed on the lower mounting table D2.

The mounting table D1 is rotatably supported by the first hinge H1 around the edge of the lower mounting table D2. That is, the upper glass member G1 is configured to rotate with respect to the lower glass member G2 so as to be switched between: a state of being butt-jointed to the lower glass member G2 and thereby closing the cavity; and a state of being separated from the lower glass member G2 and thereby opening the cavity.

Furthermore, a resin injection port is provided on the cavity and on the lower glass member G2 of the inner glass opening-and-closing unit M1. The resin injection port is a hole that is used to inject a liquiform resin, that is, a pre-cured resin into the inside of the cavity.

Moreover, a shielding portion made of a chrome (Cr) film is provided on the surface, at which the lower glass member G2 of the inner glass opening-and-closing unit M1 is to be butt-jointed to the upper glass member G1, and on the portion other than the groove. The shielding portion is formed by coating the lower glass member G2 with chrome. The shielding portion is used so as to avoid a resin material, which is present in each of the resin injection port and an air space communicated with this resin injection port, from being irradiated with ultraviolet light that is used to cause a resin material in the cavity to be cured.

As shown in FIGS. 2A and 2B, the outer opening-and-closing unit M2 is provided with a pair of covers C1 and C2, a second hinge H2, a pair of light sources L1 and L2, a magnet N1, a magnet catch N2 and a damper P.

The lower cover C2 is fixed on the base B, the upper cover C1 is rotatably supported by the second hinge H2 around the edge of the lower cover C2. Moreover, the paired mounting tables D1 and D2 are fitted into the respective insides of the paired covers C1 and C2. That is, the upper mounting table D1 and the upper cover C1 are figured to rotate with respect to the lower mounting table D2 and lower cover C1. The above-mentioned inner glass opening-and-closing unit M1 and the above-described outer opening-and-closing unit M2 are removable.

The light sources L1 and L2 are ultraviolet light emitters and are provided in the paired covers C1 and C2, respectively. In the optical fiber coater M, the light sources L1 and L2 emit ultraviolet light to the injected resin. Subsequently, the resin that is irradiated with ultraviolet light is cured.

The magnet N1 is provided in one of the paired covers C1 and C2 and the magnet catch N2 is provided in the other thereof so that the magnet N1 and the magnet catch N2 are provided to face each other when the covers C1 and C2 are in a closed state. When the covers C1 and C2 are in a closed state, as a result of attracting the magnet catch N2 to the magnet N1, the upper glass member G1 in the inner glass opening-and-closing unit M1 is butt-jointed to the lower glass member G2, becomes in a state of closing the cavity, and is stable with respect to the lower glass member G2.

The damper P is provided on the surface at which the cover C1 faces the cover C2 and reduces an impact when the glass member G1 collides the glass member G2 during operation of closing the inner glass opening-and-closing unit M1 and the outer opening-and-closing unit M2

The optical fiber holder K is used to hold an optical fiber that is in a state of being extracted from both sides of the optical fiber coater M when the optical fiber is set on the optical fiber coater M.

A pair of optical fiber holders K which are located at both sides of the optical fiber coater M are provided on the base B.

Moreover, in the optical fiber re-coating device A, instead of the above-mentioned damper P, a friction applying mechanism NK that is used to reduce an impact during operation of opening and closing the inner glass opening-and-closing unit M1 and the outer opening-and-closing unit M2 may be provided at the second hinge H2 of the outer opening-and-closing unit M2.

Figure 3:
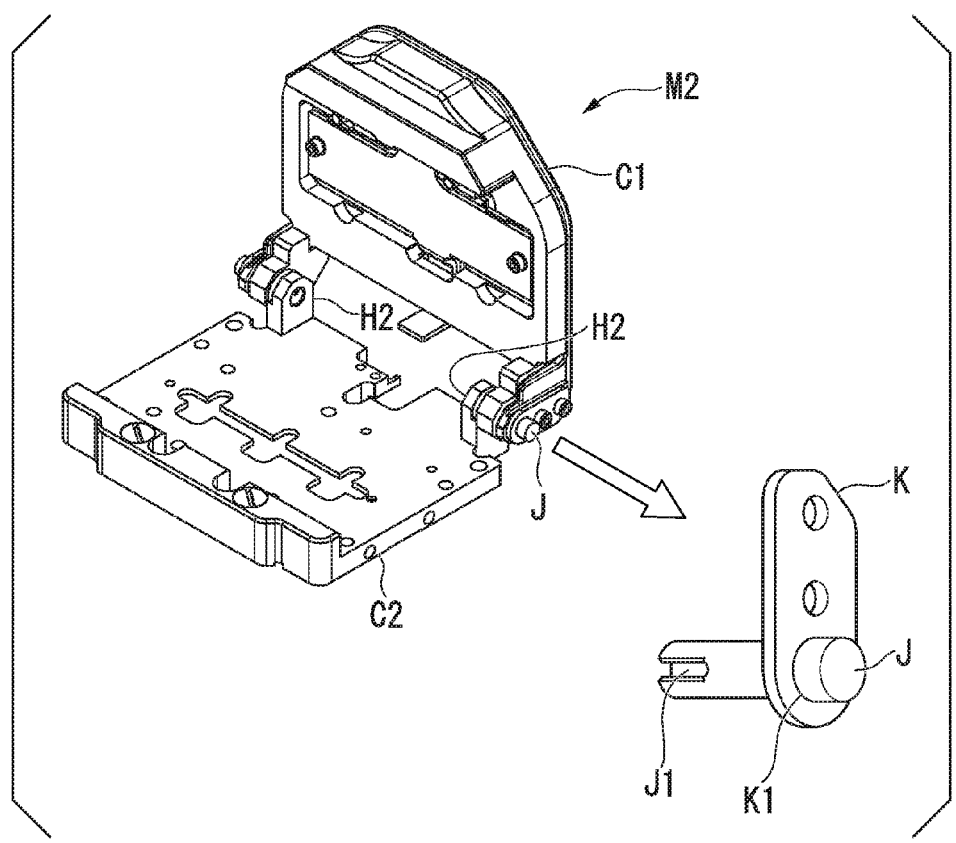
FIG. 3 is a view showing a friction applying mechanism according to the first embodiment of the invention.
Figure 4A:
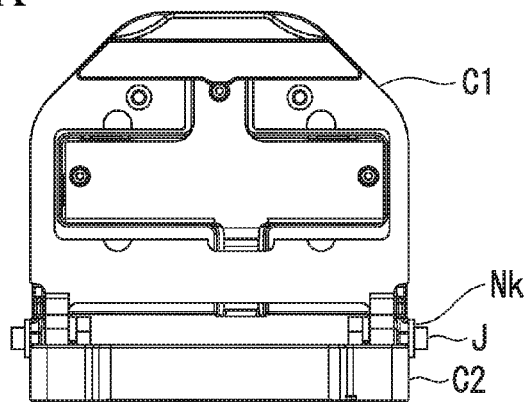
FIG. 4A is a view showing a friction applying control mechanism according to the first embodiment of the invention.
Figure 4B:
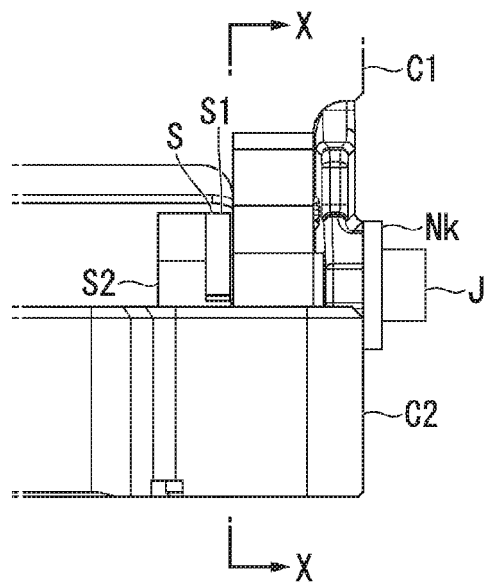
FIG. 4B is a view showing the friction applying control mechanism according to the first embodiment of the invention.
Figure 4C:
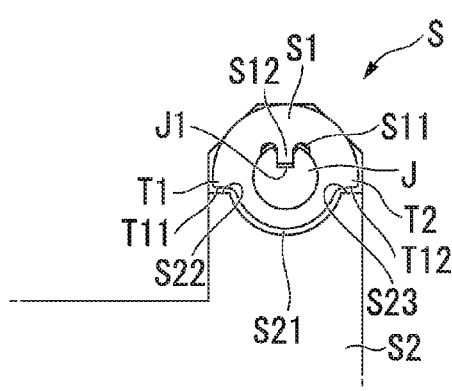
FIG. 4C is a view showing the friction applying control mechanism according to the first embodiment of the invention.

As shown in FIG. 3, the friction applying mechanism NK has a hole portion K1 provided on a plate-shaped member and is fixed to the cover C1. A rotation shaft J of the second hinge H2 is inserted into the hole portion K1 provided in the friction applying mechanism NK, a peripheral surface of the rotation shaft J of the second hinge H2 comes into contact with the inner peripheral face of the hole portion K1 provided in the friction applying mechanism NK, and a frictional force is generated therebetween, as a result thereof, it is possible to reduce an impact during operation of opening and closing the inner glass opening-and-closing unit M1 and the outer opening-and-closing unit M2.

Additionally, a friction applying control mechanism S may be provided at the second hinge H2 in the optical fiber re-coating device A, and the mechanism limits the range in which the rotation shaft J comes into contact with the inner peripheral face of the hole portion K1 of the friction applying mechanism NK when the aforementioned rotation shaft J rotates, that is, during operation of opening and closing the inner glass opening-and-closing unit M1 and the outer opening-and-closing unit M2.

In the case where the friction applying mechanism NK is provided, when a frictional force is generated on the rotation shaft J at all times, a large load in addition to an attraction force due to the magnet occurs at the moment at which an operator turns the closed state of the inner glass opening-and-closing unit M1 and the outer opening-and-closing unit M2 to the open state thereof. The above-described friction applying control mechanism S is used to control the frictional force to be partially generated.

As shown in FIGS. 3 and 4A to 4C, the friction applying control mechanism S is configured to include a rotation unit S1 formed by a plate-shaped member and a support base S2 that supports the rotation unit S1.

The rotation unit S1 is formed of a plate-shaped member as described above, and the outer shape thereof is a shape such that substantial semicircles having diameter different from each other are combined so that the circle centers thereof are matched. In addition, the rotation unit S1 has a hole portion S11 provided on the center thereof, and rotation shaft J is inserted thereinto. Furthermore, the rotation unit S1 has a protuberance S12 provided inside the hole portion S11, and the protuberance is fitted into a groove portion J1 provided on the rotation shaft J. The protuberance S12 is fitted into the groove portion J1, and the rotation shaft J is thereby fixed with respect to the rotation shaft J.

The support base S2 is fixed to the lower cover C2 and has a recess portion S21 provided thereon. A substantial semicircle side of the rotation unit S1 which has a small diameter is fitted into the recess portion. The substantial semicircle side of the rotation unit S1 which has a small diameter is rotatably supported by the recess portion 21. The rotation unit S1 has a substantial semicircle side which has a large diameter which is larger in diameter than the substantial semicircle side having a small diameter, and the rotation unit thereby includes two protrusions, that is, a first protrusion T1 and a second protrusion T2.

The first protrusion T1 and the second protrusion T2 which are near the support base S2 are first flat portions T11 and T12 which are each formed in a linear shape. Furthermore, the portions of the support base S2 which face the first flat portion T11 of the first protrusion T1 and the first flat portion T12 of the second protrusion T2 are second flat portions S22 and S23 which are each formed in a linear shape. When the cover C1 is in a vertical state as shown in PART (a) of FIG. 5, gaps are present between the first flat portion T11 and the second flat portion S22 and between the first flat portion T12 and the second flat portion S23.

Figure 5:
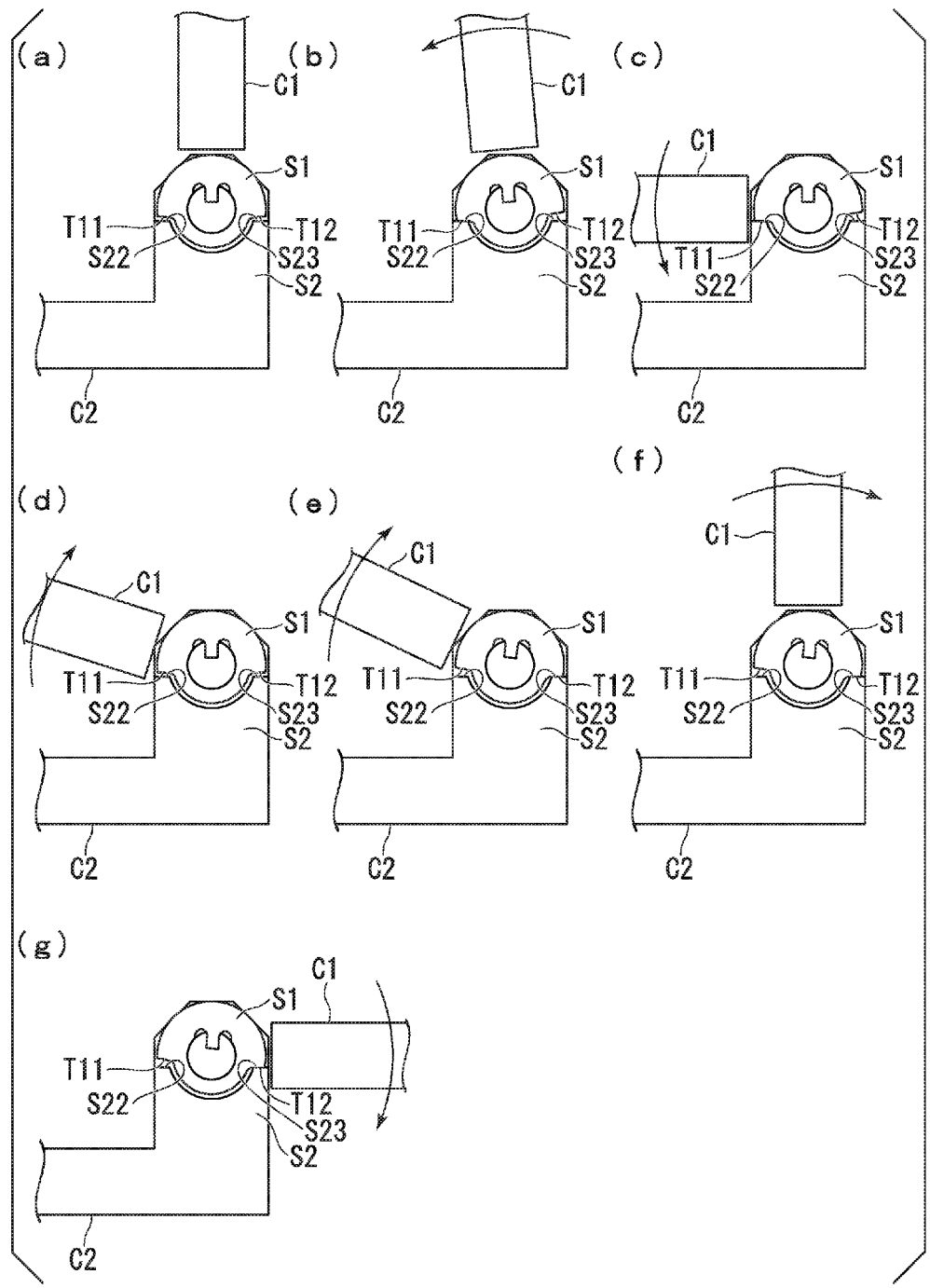
FIG. 5 is a view showing an action of the friction applying control mechanism according to the first embodiment of the invention.

When the cover C1 is in a closing operation as shown in PART (b) of FIG. 5 and first flat portion T11 of the first protrusion T1 is thereby in contact with the second flat portion S22 of the support base S2, the rotation shaft J of the second hinge H2 comes into contact with the inner peripheral face of the hole portion K1 of the friction applying mechanism NK, and a frictional three is generated therebetween. As a result, during the closing operation of the cover C1 from PART (b) of FIG. 5 to PART (c) thereof, it is possible to reduce an impact due to the closing operation.

On the other hand, as shown in PART (d) and PART (e) of FIG. 5, when the cover C1 is in an opening operation and the first flat portion T21 of the second protrusion T2 is thereby contact with the second flat portion S23 of the support base S2, the rotation shaft J of the second hinge H2 comes into contact with the hole portion K1 of the friction applying mechanism NK, and a frictional force is generated therebetween. As a result, during the opening operation of the cover C1 from PART (e) of FIG. 5 to PART (g) thereof, it is possible to reduce an impact due to the opening operation.

Particularly, in the case where the cover C1 is located at the positions shown in PART (c) of FIG. 5 to PART (e) thereof, as the first flat portion T11 of the first protrusion T1 is not in contact with the second flat portion S22 of the support base S2 and the first flat portion T21 of the second protrusion T2 is not in contact with the second flat portion S23 of the support base S2, the rotation shaft J of the second hinge H2 does not come into contact with the inner peripheral face of the hole portion K1 of the friction applying mechanism NK; therefore, a load due to a frictional force does not occur, and it is possible to easily change a position of the cover C1 by the opening operation.

Moreover, a play-reducing mechanism Y that is used to reduce play in the first hinge H1 may be provided in the optical fiber re-coating device A.

Figure 6A:
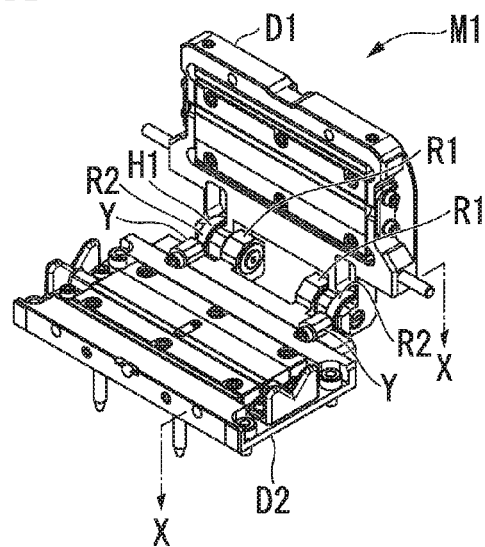
FIG. 6A is an example showing a play-reducing mechanism according o the first embodiment of the invention.
Figure 6B:
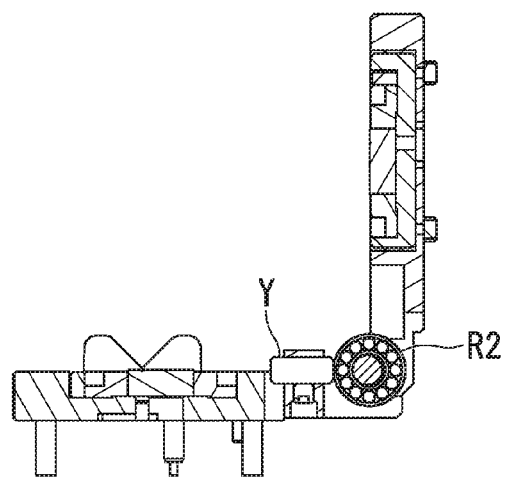
FIG. 6B is an example showing a play-reducing mechanism according to the first embodiment of the invention.
Figure 6C:
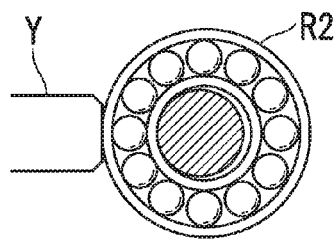
FIG. 6C is an example showing a play-reducing mechanism according to the first embodiment of the invention.

As shown in FIGS. 6A to 6C, the first hinge H1 includes a pair of first ball bearings R1 used for open and close and a pair of second hall bearings R2 that are used to reduce play in combination. As shown in FIGS. 6A to 6C, the above-mentioned play-reducing mechanism Y is a pressing mechanism that presses against the peripheral surface of the outer ring of the second ball bearing R2 toward the center of the second ball bearing R2. A pressing force due to the above-described play-reducing mechanism Y is adjusted by a screw.

As a result of providing the aforementioned play-reducing mechanism Y, part of the outer ring of the second ball bearing R2 is pressed, a width between the outer ring and the inner ring thereby becomes narrow, and it is possible to reduce play in of the first hinge H1. Consequently, displacement of the upper mounting table D1 with respect to the lower mounting table D2, that is, displacement of the upper glass member G1 with respect to the lower glass member G2 can be reduced within several microns.

Figure 7:
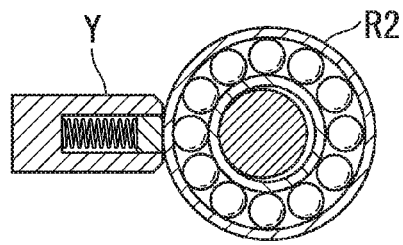
FIG. 7 is an example showing a play-reducing mechanism according to the first embodiment of the invention.

Additionally, as shown in FIG. 7, the optical fiber re-coating device A may be configured so that a further stabilized pressing force can be applied to the outer ring of the second ball bearing R2 by a plunger that serves as the above-described play-reducing mechanism Y and is provided with a spring.

According to the above-described first embodiment, the optical fiber coater M is provided which includes: the inner glass opening-and-closing unit M1 including: the paired glass members G1 and G2 having grooves formed thereon; and the paired of mounting tables D1 and D2 on which the respective glass members G1 and G2 are provided and which are coupled to each other via the first hinge H1, wherein a hollow that is used to coat an optical fiber is formed by matching the grooves of the paired glass members G1 and G2 when the mounting tables D1 and D2 are in a closed state; and the outer opening-and-closing unit M2 including: the paired of covers C1 and C2 into which the respective paired mounting tables D1 and D2 are fitted and which are coupled to each other via the second hinge H2, one of the paired covers C1 and C2 having the magnet N1 provided therein, the other of the paired covers C1 and C2 having the magnet catch N2 provided therein, the magnet N1 and the magnet catch N2 facing each other when the paired covers C1 and C2 are in a closed state; and the light sources L1 and L2 that cure a resin used to coat an optical fiber provided in the inner glass opening-and-closing unit M1 and is provided in both the paired covers C1 and C2 or in one of the paired covers C1 and C2, and wherein the inner glass opening-and-closing unit M1 and the outer opening-and-closing unit M2 are removable. As a result, when the outer opening-and-closing unit M2 is in an open state, the inner glass opening-and-closing unit M1 is also in an open state, therefore, it is possible to improve handleability more than ever before.

Furthermore, according o the first embodiment, since the light sources L1 and L2 are not provided in the inner glass opening-and-closing unit M1 and provided in the outer opening-and-losing unit M2, it is not necessary to carry out a complicated operation of connecting electric power lines of the light sources L1 and L2 during replacement of the inner glass opening-and-closing unit M1 in the case where the light sources L1 and L2 provided in the inner glass opening-and-closing unit M1.

In addition, according to the first embodiment, since the light sources L1 and L2, the magnet N1, and the magnet catch N2 are not provided in the inner glass opening-and-closing unit M1 and provided in the outer opening-and-closing unit M2, it is not necessary to provide the light sources L1 and L2, the magnet N1, and the magnet catch N2 in each inner glass opening-and-closing unit M1 even in cases where various inner glass opening-and-closing units M1 are manufactured, as a result, it is possible to reduce the manufacturing cost thereof.

Moreover, according to the first embodiment, since the magnet N1 and the magnet catch N2 are not provided in the inner glass opening-and-closing unit M1 and are provided in the outer opening-and-closing unit M2, when the inner glass opening-and-closing unit M1 is removed from the outer opening-and-closing unit M2 and position adjustment of the mounting tables D1 and D2 is carried out, the position adjustment of the mounting tables D1 and D2 is not hindered by an attraction force between the magnet N1 and the magnet catch N2, and the position adjustment of the mounting tables D1 and D2 can be easily carried out.

(Second Embodiment)

Next, a second embodiment be described.

Figure 8A:
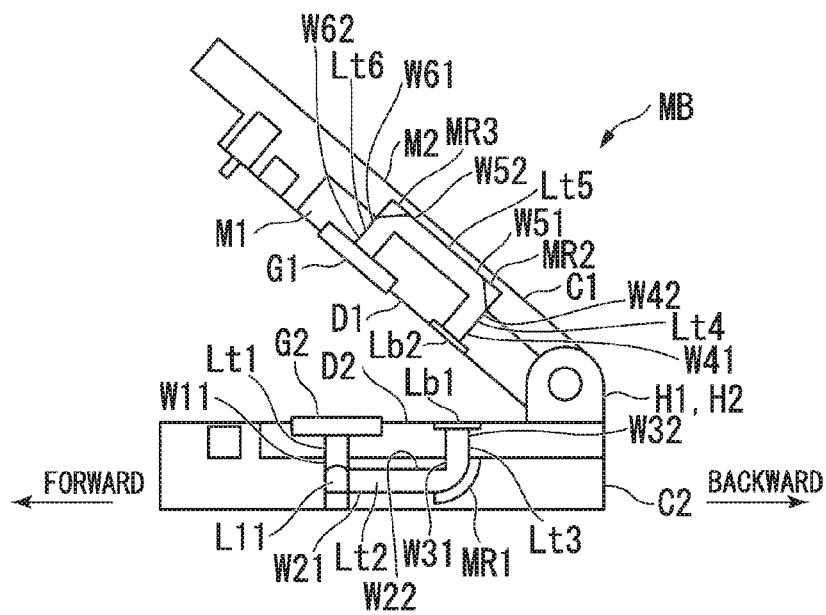
FIG. 8A is a cross-sectional side view showing a structure according to a second embodiment of the invention.
Figure 8B:
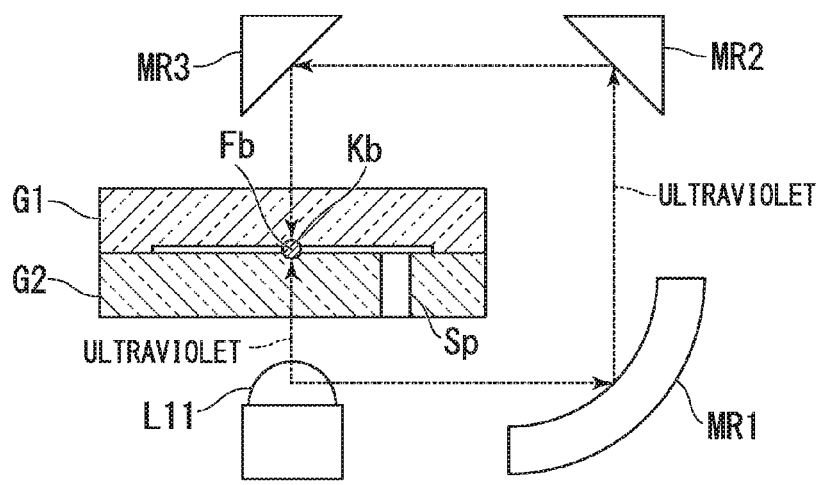
FIG. 8B is a view explaining an action according to the second embodiment of the invention.

An optical fiber coater MB according to a second embodiment is different from the above-described first embodiment in the following points. Particularly, as shown in FIGS. 8A and 8B, the optical fiber coater MB is different from the above-described first embodiment in that the optical fiber coater MB newly includes: a single light source L11 instead of the two light sources L1 and L2; three mirrors (a first mirror MR1, a second mirror MR2, a third mirror MR3); six light passing holes (a first light passing hole Lt1, a second light passing hole Lt2, a third light passing hole Lt3, a fourth light passing hole Lt4, a fifth light passing hole Lt5, and a sixth light passing hole Lt6); and two light-transmissive plates (a first light-transmissive plate Lb1 and a second light-transmissive plate Lb2).

The aforementioned light source L11 is a ultraviolet light emitter which is similar to the light sources L1 and L2 according to the first embodiment and is provided in the lower cover C2 of the paired covers C1 and C2. Specifically, the light source L11 is implanted into the cover C2 so as to be adjacent to a lower end w11 of the first light passing hole Lt1 that is provided directly under the lower glass member G2 in the thickness direction of the mounting table D2 and the cover C2 which are incorporated into a body.

Furthermore, the light source L11 is adjacent to one end w21 that is the front end side of the second light passing hole Lt2 that extends from the front of the cover C2 to the back thereof. For this reason, the lower glass member G2 is irradiated with ultraviolet light emitted from e light source L11 through the above-described first light passing hole Lt1; in addition, the first mirror MR1 adjacent to the other end w22 of the second light passing hole Lt2 is irradiated with the ultraviolet light through the second light passing hole Lt2.

The first mirror MR1 is a concave mirror having a reflecting surface that is curved in a concave shape, the reflecting surface faces the light source L11 via the second light passing hole Lt2, and the first mirror is implanted into the lower cover C2 so as to face the first light-transmissive plate Lb1 via the third light passing hole Lt3. Ultraviolet light is incident to the first mirror MR1 from the light source L11 through the second light passing hole Lt2, and the first mirror reflects the ultraviolet light to the first light-transmissive plate Lb1 through the third light passing hole Lt3.

The second mirror MR2 is a plane mirror having a flat reflecting surface, the reflecting surface faces the second light-transmissive plate Lb2 via the fourth light passing hole Lt4, and the second mirror is implanted into the upper cover C1 so as to face the reflecting surface of the third mirror MR3 via the fifth light passing hole Lt5. Ultraviolet light is reflected by the first mirror MR1 and thereafter passes through the third light passing hole Lt3, the first light-transmissive plate Lb1, the second light-transmissive plate Lb2, and the fourth light passing hole Lt4; and the ultraviolet light is incident to the second mirror MR2, and the second mirror reflects the ultraviolet light to the third mirror MR3 via the fifth light passing hole Lt5.

The third mirror MR3 is a plane mirror having a flat reflecting surface, the reflecting surface faces the reflecting surface of the second mirror MR2 via the fifth light passing hole Lt5, and the third mirror is implanted into the upper cover C1 so as to face the upper glass member G1 via the sixth light passing hole Lt6. Ultraviolet light is incident to the third mirror MR3 from the second mirror MR2 through the fifth light passing hole Lt5, and the third mirror reflects the ultraviolet light to the upper glass member G1 through the sixth light passing hole Lt6.

The first light passing hole Lt1 is formed directly under the lower glass member G2 in the thickness direction of the mounting table D2 and the cover C2 which are incorporated into a body, and the lower end with is adjacent to the light source L11. The first light passing hole Lt1 is a hole that is used to guide the ultraviolet light emitted from the aforementioned light source L11 into the groove of the lower glass member G2, i.e., into a cavity Kb.

The second light passing hole Lt2 is formed so as to extend rearward from the front end side of the lower cover C2, one end w21 that is the front end side thereof is adjacent to the light source L11, and the other end w22 thereof is adjacent to the reflecting surface of the first mirror MR1. The second light passing hole Lt2 is a hole that is used to guide, to the first mirror MR1, the ultraviolet light emitted from the above-described light source L11.

The third light passing hole Lt3 formed directly under the first light-transmissive plate Lb1 in the thickness direction of the mounting table D2 and the cover C2 which are incorporated into a body, a lower end w31 thereof is adjacent to the reflecting surface of the first mirror MR1, and an upper end w32 thereof is adjacent to the lower surface of the first light-transmissive plate Lb1. The third light passing hole Lt3 is a hole that is used to guide, to the first light-transmissive plate Lb1, the ultraviolet light reflected by the first mirror MR1.

The fourth light passing hole Lt4 is formed directly above the second light-transmissive plate Lb2 in the thickness direction of the mounting table D1 and the cover C1 which are incorporated into a body, a lower end w41 thereof is adjacent to the upper surface of the second light-transmissive plate Lb2, and an upper end w42 thereof is adjacent to the reflecting surface of the second mirror MR2. The fourth light passing hole Lt4 is a hole that is used to guide, to the second mirror MR2, the ultraviolet light that passes through the first light-transmissive plate Lb1 and the second light-transmissive plate Lb2.

The fifth light passing hole Lt5 is formed so as to extend forward from the back side of the cover C1, one end w51 that is the back side thereof is adjacent to the reflecting surface of the second mirror MR2, the other end w52 thereof is adjacent to the reflecting surface of the third minor MR3. The fifth light passing hole Lt5 is a hole that is used to guide, to the third mirror MR3, the ultraviolet light reflected by the second mirror MR2.

The sixth light passing hole Lt6 is formed directly above the upper glass member G1 in the thickness direction of the mounting table D1 and the cover C1 which are incorporated into a body, an upper end w61 thereof is adjacent to the reflecting surface of the third mirror MR3, and a lower end w62 thereof is adjacent to the upper surface of the upper glass member G1. The sixth light passing hole Lt6 is a hole that is used to guide the ultraviolet light reflected by the aforementioned third mirror MR3 into the groove of the upper glass member G1, i.e., into the cavity Kb.

The first light-transmissive plate Lb1 is, for example, a glass plate and is fixed to the upper surface side of the lower mounting table D2 so as to be adjacent to the upper end w32 of the third light passing hole Lt3. The second light-transmissive plate Lb2 is, for example, a glass plate and is fixed to the lower surface side of the upper mounting table D1 so as to be adjacent to the lower end w41 of the fourth light passing hole Lt4.

Next, an action according to the second embodiment having the above-described configuration will be described.

Firstly, as shown in FIG. 8B, an optical fiber Fb whose coating is removed is accommodated in the cavity Kb. Subsequently, a resin in a liquid state is supplied by a pump which is not shown in the figure through a spool Sp provided in the thickness direction of the lower glass member G2. Particularly, the above-mentioned spool Sp is a hole provided in the lower glass member G2 in order to supply the liquiform resin. Next, when the resin in a liquid state is supplied through the spool Sp, the liquiform resin is injected into the cavity Kb, and the liquiform resin is adhered to the periphery of the optical fiber Fb inside the cavity Kb. After the above-described state is obtained, the above-described light source L11 starts irradiation of ultraviolet light.

Subsequently, the lower glass member G2 is irradiated with part of ultraviolet light emitted from the light source L11 through the first light passing hole Lt1. That is, the ultraviolet light emitted from the light source L11 is directed to the lower side of the cavity Kb and the lower side is irradiated with the ultraviolet light (refer to FIG. 8B).

Moreover, part of ultraviolet light emitted from the above-described light source L11 is incident to the first mirror MR1 through the second light passing hole Lt2. Continuously, the ultraviolet light that is incident to the first mirror MR1 is reflected by the first mirror MR1 and is incident to the first light-transmissive plate Lb1 through the third light passing hole Lt3. The ultraviolet light that is incident to the first light-transmissive plate Lb1 passes through the first light-transmissive plate Lb1, also passes through the second light-transmissive plate Lb2, and is incident to the second mirror MR2 through the fourth light passing hole Lt4. The ultraviolet light that is incident to the second mirror MR2 is reflected by the second mirror MR2 and is incident to the third mirror MR3 through the fifth light passing hole Lt5.

The ultraviolet light that is incident to third mirror MR3 is reflected by the third mirror MR3, and the upper glass member G1 is irradiated with the ultraviolet light through the sixth light passing hole Lt6. That is, part of the ultraviolet light emitted from the light source L11 is directed to the upper side of the cavity Kb and the upper side is irradiated with the ultraviolet light (refer to FIG. 8B). In the second embodiment, it is possible to irradiate the cavity Kb with the ultraviolet light in the upward and downward directions in the above-described manner.

According to the above-described second embodiment, this embodiment exhibits the following effect in addition to the effect of the first embodiment. Particularly, according to the second embodiment, as the optical fiber Fb accommodated in the cavity Kb is irradiated with the ultraviolet light in the upward and downward directions by use of the ultraviolet light emitted from the single light source L11, the resin can be effectively cured, and it is thereby possible to reduce the number of parts of the light sources. Additionally, in the above-mentioned second embodiment, a single light source L11 is provided in the lower cover C2; however, the invention is not limited to this. For example, a single light source L11 may be provided in the upper cover C1, the upper glass member G1 may be irradiated with ultraviolet light emitted from the light source L11, the ultraviolet light is guided to the lower glass member G2 by use of mirrors which is similar manner to that of the second embodiment, an optical fiber Fb accommodated in the cavity Kb may be irradiated with the ultraviolet light in the upward and downward directions. That is, it is only necessary to provide a light source, which cures a resin that is used to coat the optical fiber Fb provided in the cavity Kb of the glass members G1 and G2, at least one of the paired covers C1 and C2.

DESCRIPTION OF REFERENCE NUMERAL

A . . . optical fiber re-coating device A, M . . optical fiber coater, K . . . optical fiber holder, B . . . base, M1 . . . inner glass opening-and-closing unit, M2 . . . outer opening-and-closing unit, G1, G2 . . . glass member, D1, D2 . . . mounting table, H1 . . . first hinge, C1, C2 . . . cover, H2 . . . second hinge, L1, L2 . . . light source, N1 . . . magnet, N2 . . . magnet catch, P . . . damper, MB . . . optical fiber coater, L11 . . . light source, MR1 . . . first mirror, MR2 . . . second mirror, MR3 . . . third mirror, Lt1 . . . first light passing hole, Lt2 . . . second light passing hole, Lt3 . . . third light passing hole, Lt4 . . . fourth light passing hole, Lt5 . . . fifth light passing hole, Lt6 . . . sixth light passing hole, Lb1 . . . first light-transmissive plate, Lb2 . . . second light-transmissive plate, w11 . . . lower end, w21 . . . one end, w22 . . . other end, w31 . . . lower end, w32 . . . upper end, w41 . . . lower end, w42 . . . upper end, w51 . . . one end, w52 . . . the other end, w61 . . . upper end, w62 . . . lower end, Kb . . . cavity, Fb . . . optical fiber, Sp. . . . spool

What is claimed is:

1. An optical fiber re-coating device comprising an optical fiber coater that cures resin and coats a coating-removed portion of an optical fiber therewith, the optical fiber coater comprising:
   an inner glass opening-and-closing unit comprising: a pair of glass members having grooves formed thereon; and a pair of mounting tables on which the pair of glass members are provided and which are coupled to each other via a first hinge, wherein a hollow that is used to coat an optical fiber is formed by matching the grooves of the pair of glass members when the pair of mounting tables are in a closed state; and
   an outer opening-and-closing unit comprising: a pair of covers into which the pair of mounting tables are fitted and which are coupled to each other via a second hinge, one of the pair of covers having a magnet provided therein, the other of the pair of covers having a magnet catch provided therein, the magnet and the magnet catch facing each other when the pair of covers are in a closed state; and light sources that cure a resin used to coat the optical fiber provided in the inner glass opening-and-closing unit and are provided in the pair of covers, wherein
   the inner glass opening-and-closing unit and the outer opening-and-closing unit are removable, and
   when the pair of covers are in a closed state, the magnet attracts the magnet catch, the pair of glass members are butt-jointed to each other, and the hollow is thereby in a closed state.

2. The optical fiber re-coating device according to claim 1, wherein
   the first hinge comprises a play-reducing mechanism that is used to reduce play.

3. The optical fiber re-coating device according to claim 2, wherein
   the play-reducing mechanism is a pressing mechanism that presses, toward a center of the ball bearing, against a peripheral surface of an outer ring of a ball bearing provided in the first hinge.

4. The optical fiber re-coating device according to claim 3, wherein
   the first hinge comprises a first ball bearing used for open and close and a second ball bearing that is used to reduce play, and
   the pressing mechanism presses the second ball bearing.

5. The optical fiber re-coating device according to claim 1, wherein
the second hinge comprises a friction applying mechanism that comes into contact with a peripheral surface of a rotation shaft of the second hinge, thereby generates a frictional force thereon, and is used to reduce an impact during operation of opening and closing the inner glass opening-and-closing unit and the outer opening-and-closing unit.

6. The optical fiber re-coating device according to claim 5, wherein
the second hinge comprises a friction applying control mechanism that limits a range in which the rotation shaft is in contact with the friction applying mechanism during rotation of the rotation shaft.

7. An optical fiber re-coating device comprising an optical fiber coater that cures resin and coats a coating-removed portion of an optical fiber therewith, the optical fiber coater comprising:
an inner glass opening-and-closing unit comprising: a pair of glass members having grooves formed thereon; and a pair of mounting tables on which the pair of glass members are provided and which are coupled to each other via a first hinge, wherein a hollow that is used to coat an optical fiber is formed by matching the grooves of the pair of glass members when the pair of mounting tables are in a closed state; and
an outer opening-and-closing unit comprising: a pair of covers into which the pair of mounting tables are fitted and which are coupled to each other via a second hinge, one of the pair of covers having a magnet provided therein, the other of the pair of covers having a magnet catch provided therein, the magnet and the magnet catch facing each other when the pair of covers are in a closed state; and a light source that cures a resin used to coat the optical fiber provided in the inner glass opening-and-closing unit and is provided in one of the pair of covers, and wherein
the inner glass opening-and-closing unit and the outer opening-and-closing unit are removable, and
when the pair of covers are in a closed state, the magnet attracts the magnet catch, the pair of glass members are butt-jointed to each other, and the hollow is thereby in a closed state.

8. The optical fiber re-coating device according to claim 7, wherein
the first hinge comprises a play-reducing mechanism that is used to reduce play.

9. The optical fiber re-coating device according to claim 8, wherein
the play-reducing mechanism is a pressing mechanism that presses, toward a center of the ball bearing, against a peripheral surface of an outer ring of a ball bearing provided in the first hinge.

10. The optical fiber re-coating device according to claim 9, wherein
the first hinge comprises a first ball bearing used for open and close and a second ball bearing that is used to reduce play, and
the pressing mechanism presses the second ball bearing.

11. The optical fiber re-coating device according to claim 7, wherein
the second hinge comprises a friction applying mechanism that comes into contact with a peripheral surface of a rotation shaft of the second hinge, thereby generates a frictional force thereon, and is used to reduce an impact during operation of opening and closing the inner glass opening-and-closing unit and the outer opening-and-closing unit.

12. The optical fiber re-coating device according to claim 11, wherein
the second hinge comprises a friction applying control mechanism that limits a range in which the rotation shaft is in contact with the friction applying mechanism during rotation of the rotation shaft.

* * * * *